United States Patent
Kotzin

(10) Patent No.: US 6,865,401 B2
(45) Date of Patent: Mar. 8, 2005

(54) WIRELESS RADIO ARCHITECTURES AND METHODS THEREFOR

(75) Inventor: Michael Kotzin, Buffalo Grove, IL (US)

(73) Assignee: Motorola, Inc., Schaumburg, IL (US)

(*) Notice: Subject to any disclaimer, the term of this patent is extended or adjusted under 35 U.S.C. 154(b) by 9 days.

(21) Appl. No.: 10/331,255

(22) Filed: Dec. 30, 2002

(65) Prior Publication Data

US 2004/0204028 A1 Oct. 14, 2004

(51) Int. Cl.$^7$ .............................. H04B 1/38; H04M 1/00
(52) U.S. Cl. ................ 455/557; 455/426.1; 455/556.1; 455/558; 455/575.1; 455/90.1; 455/90.3; 455/556.2
(58) Field of Search .............................. 455/556.1, 557, 455/558, 90.1, 90.3, 575.1, 426.1, 435.2, 433, 552.1, 517

(56) References Cited

U.S. PATENT DOCUMENTS

| | | | | |
|---|---|---|---|---|
| 5,535,434 A | * | 7/1996 | Siddoway et al. | 455/575.1 |
| 5,890,074 A | * | 3/1999 | Rydbeck et al. | 455/558 |
| 5,894,597 A | * | 4/1999 | Schwartz et al. | 455/558 |
| 5,913,163 A | * | 6/1999 | Johansson | 455/426.1 |
| 5,943,616 A | * | 8/1999 | Andersson | 455/422.1 |
| 5,963,872 A | * | 10/1999 | Stein | 455/557 |
| 6,016,432 A | * | 1/2000 | Stein | 455/557 |
| 6,396,612 B1 | * | 5/2002 | Bjorndahl | 398/121 |
| 6,519,475 B1 | * | 2/2003 | Kim | 455/557 |
| 6,717,801 B1 | * | 4/2004 | Castell et al. | 361/683 |
| 6,771,981 B1 | * | 8/2004 | Zalewski et al. | 455/557 |

FOREIGN PATENT DOCUMENTS

WO    WO 02/23868 A1    3/2002

OTHER PUBLICATIONS

"Wildseed Smart Skins", http://www.wildseed.com/tech/skins.asp, Oct. 15, 2002, 4 pages.

"Sneak preview: a Linux powered wireless phone", http://www.linuxdevices.com/articles/AT5512478189.html, Oct. 15, 2002, 5 pages.

* cited by examiner

*Primary Examiner*—Marceau Milord
(74) *Attorney, Agent, or Firm*—Roland K. Bowler, II

(57) ABSTRACT

A system of mobile communications devices including a first electronics device (310) having a first radio module (304) removably coupled thereto, a second electronics device (320), having a second radio module (302) removably coupled thereto, the radio modules supporting common radio communications devices when both of the first and second radio modules are coupled to the same device, and the first and second radio modules supporting radio communications of the first and second devices when coupled thereto.

25 Claims, 3 Drawing Sheets

WIRELESS RADIO ARCHITECTURES AND METHODS THEREFOR

FIELD OF THE INVENTIONS

The present inventions relate generally to wireless radio communications, and more particularly to radio architectures for mobile wireless communications devices, for example cellular telephone handsets, radio transceivers and methods therefor.

BACKGROUND OF THE INVENTIONS

Cellular telephones having removable data cards, including Subscriber Identity Module (SIM) cards, are known generally. Wildseed Ltd, Kirkland, Wash. recently introduced cellular telephones having user-interchangeable software-enable covers, known commercially as SMART-SKINS, removably fastened to the telephone body, which houses core telephony functionality. The software-enable covers or skins include encrypted smart cards that change the look and feel of the user interface, for example, by providing customized ring tones, pre-configured wireless web book marks, and subscription content associated with a cover sponsor, like a popular musical ensemble.

WO 02/23868 entitled "Double-Acting Telecommunication Apparatus For Mobile Telephony" discloses a mobile telephony apparatus comprising multiple SIM data cards associated with corresponding transceivers, which are enabled to operate simultaneously but independently of one another, for example, for enabling the user to simultaneously conduct different telephone conversations on different telephone connections. In WO 02/23868, the data cards may be associated with different communications service accounts provided by the same or different service providers.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
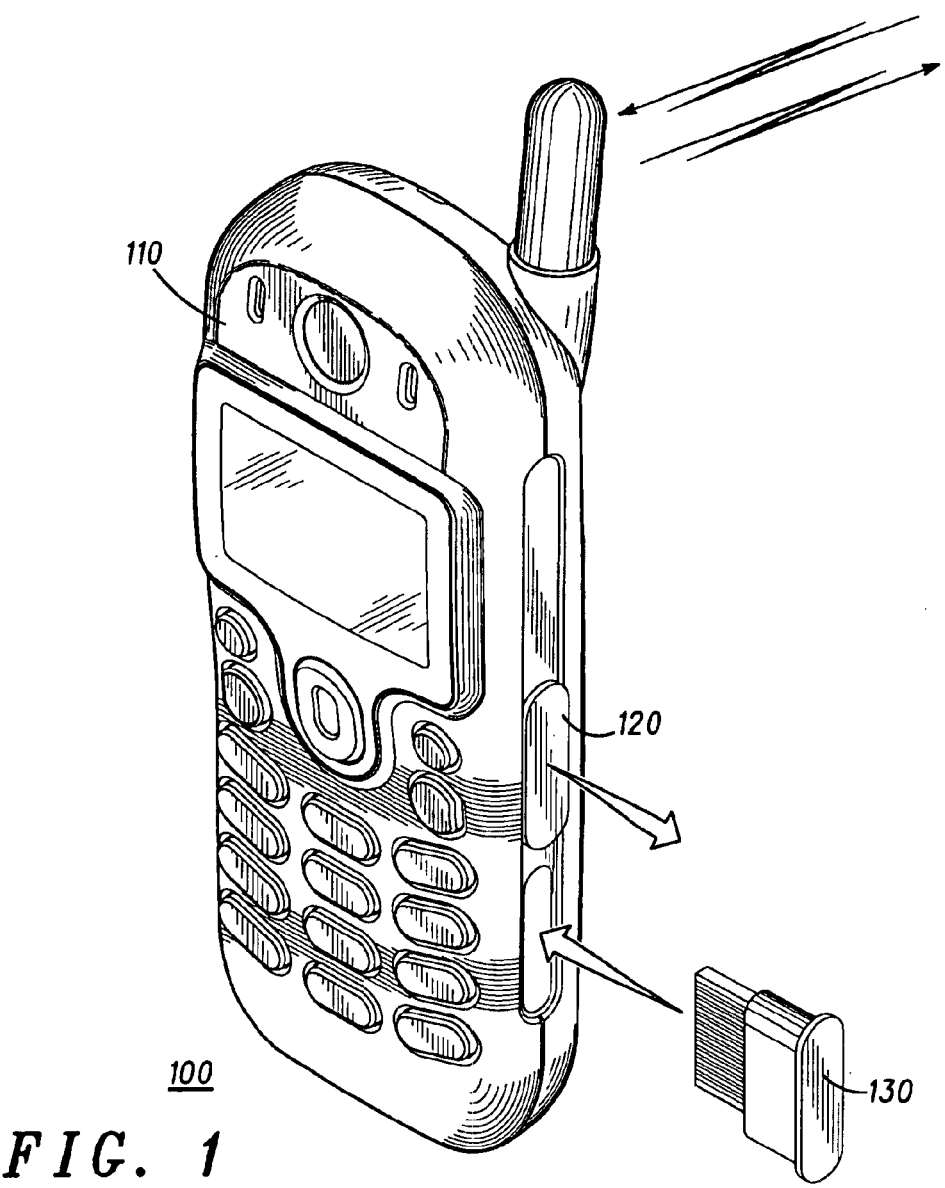
FIG. 1 is an exemplary mobile wireless communications device having one or more modular transceiver portions.

FIG. 1 illustrates a mobile wireless communications device 100, which is in the exemplary form of a cellular telephone handset, comprising generally a communications device body member 110 having two radio modules 120 and 130, which are removable coupled to communications circuit housed within the body member, as discussed below. More generally, the wireless communications device may include one or more radio modules.

In some embodiments, the one or more radio modules are transceiver modules, for example, transceivers for cellular and other radio communications. Exemplary wireless telephony protocols supported by the radio module transceivers or portions thereof include a time division multiple access based communications system, for example, the Global System for Mobile Communications (GSM), or a code division multiple access (CDMA) based communication system, for example, the Universal Mobile Telecommunications Standard (UMTS) implemented $3^{rd}$ Generation mobile wireless telephony standard.

In other embodiments, the radio modules are only capable of radio transmission or radio signal reception. For example, the radio modules may be satellite positioning system receivers or some other radio signal receiving module. More generally, the radio modules may enable or implement some other radio functionality of the device to which it is coupled.

Figure 2:
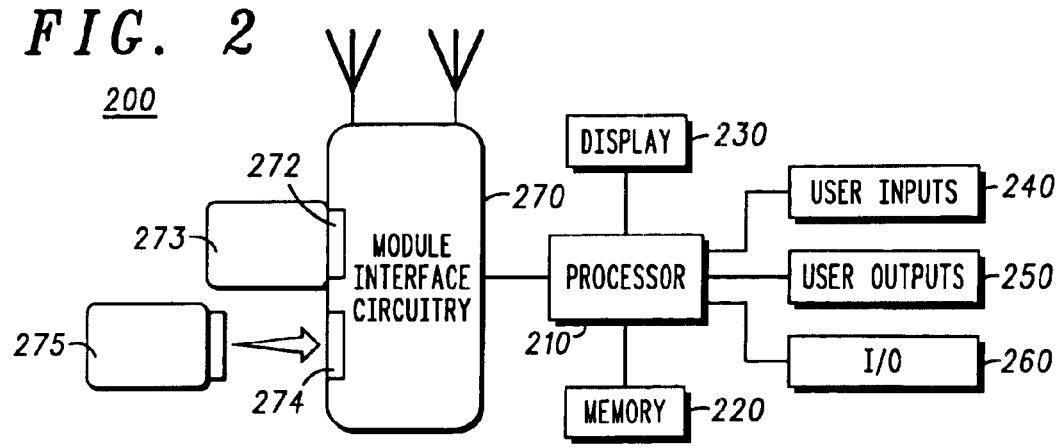
FIG. 2 is an exemplary wireless communications device schematic block diagram.

FIG. 2 illustrates a generalized schematic block diagram 200 of the exemplary cellular communications device, but the schematic is representative more generally of any electronics device. The device 200 comprises generally a processor 210 coupled to memory 220, which typically includes RAM, ROM and possibly other memory and firmware devices.

In FIG. 2, the exemplary wireless communications device includes a display 230, for example, a low-power flat panel display device, coupled to the processor for displaying information to the user. The exemplary device also include user inputs 240 coupled to the processor, for example, an alphanumeric keypad and in some embodiments a scrolling or pointing device, like a cursor control-knob or a touch sensitive input pad, and possibly a microphone.

In some embodiments, user outputs 250, for example, a speaker or other audio transducer, among other outputs, are also coupled to the processor. An input/output interface 260, for example, an infrared port or a data cable connector, is also coupled to the processor or to some other circuit of the device. The device may include these and other elements depending upon the nature and application of the device.

In FIG. 2, a radio module connecting circuit 270 is coupled to the processor 210. More generally, the interface is for connecting other modules as well. The radio module connecting circuit includes one or more radio module interface connectors for receiving a corresponding number of removable radio modules, at least one of which may be required to be connected to the circuit 270 for the device 200 to receive and/or transmit radio signals. Although in some embodiments the communications device may include integrated radio communications capabilities in addition to the one or more removable radio modules.

In the exemplary cellular telephone handset embodiment, the radio module includes a transceiver or a transceiver portion that supports communications according to a wireless communications protocol when the radio module is coupled to the circuit 270. In FIG. 2, the circuit 270 includes two interface connectors 272 and 274, each of which is capable of receiving or connecting to corresponding removably connectable radio modules 273 and 275, respectively. In other embodiments, the interface circuit is capable of receiving only a single module, or three or more modules.

In some configurations, the first and second modules are interchangeable with the first and second interface connector of the same body member, whereby any module may be connected with any connector. In other embodiments, the first and second modules are connectable with only corresponding connectors of the interfaces.

In some embodiments, a portion of the radio transceiver circuitry is included in, or coupled to, the circuit 270, for example, circuits that are dedicated for each of the radio modules that are removably coupled to the interface circuit. The interface circuit may also include, or be coupled to, circuits that are shared by transceiver portions in the first and second radio modules, for example, one or more antennas, filters, A/D converters, a digital signal processor, memory, etc. In one exemplary embodiment, the portion of the transceiver included in each of the radio modules is circuitry required for implementing essential elements of the communications protocol supported thereby, including, for example, portions of the communications circuit essential for compliance with communications standards, which are often the subject of intellectual property rights.

In the present invention, the device body member generally includes a module interface for connecting with at least one module and possibly other elements of the device, including, for example, an integrated form of the radio module. The device may thus be independently capable of radio communications without either of the modules 273 and 275. In the exemplary mobile wireless communications device, the communications device body member includes the module interface circuitry 270 and other components.

In some embodiments, at least one of the radio modules must be coupled to the interface circuit to enable communications of the device. And in other embodiments, one or both of the radio modules 273 or 275 alone will enable communications of the device when coupled thereto, assuming the device does not include integrated communications capabilities.

According to one embodiment of the invention, more than one radio module, for example, first and second radio modules 273 and 275, that communicate according to, or support, the same wireless communications protocol are coupled to the device at the same time. According to this aspect of the invention, the multiple radio modules operate integrally to support the same or common radio communications of the mobile wireless communications device. Alternatively, if the device has an integrated capability to perform radio communications, one of more of the modules 273 or 275 may be used in conjunction therewith to improve the radio performance thereof.

In one embodiment, for example, the first and second radio modules 273 and 275 operate integrally to provide increased sensitivity performance during wireless communications of the mobile wireless communication device. One such manner this might be provided is for each of the modules to be coupled to a separate antenna present on the body of the communications device. Each of the modules would provide a separate channel of reception for each antenna, each signal received respectively by each antenna receiving essentially the same processing and reduced to a baseband digital representation for each of the independent channels. Each module, by virtue of being coupled to the interface circuit on the communication device, would pass its baseband signal representation output to a diversity combiner circuit that optimally combines the two signals to provide a single improved sensitivity and more interference-robust signal that is subsequently used for device reception. The improved sensitivity and interference robustness provided by the two radio modules is compared to the sensitivity and interference robustness that would be provided by only a single one of the first and second radio modules.

In another embodiment, the first and second radio modules 273 and 275 operate integrally to provide increased throughput or data rates during wireless communications relative to the throughput that would be provided by only a single one of the first and second radio modules. One manner that this might be accomplished is to take advantage of additional signal possessing capability that is afforded by the second module. It is known that more complex algorithms may be applied to signal detection than might be possible with a single, low cost, processing element. Using as an adjunct processor the signal processing capability of the second module would allow more complex or processing intensive algorithms to be used. This common processing of the signal could also yield improved signal sensitivity or interference robustness for the device.

In other embodiments, the multiple radio modules may be used to provide other improvements in common communications of the device. For example, in a GSM GPRS data system, the data rate supported by the device is a measure of the number of TDM slots that are available for communication of the data. By exploiting the second module to support additional TDM slots, in cooperation with the primary capability of the device (e.g., integrated radio capability or with a single radio module), would allow higher average or peak data rates to be provided.

Thus either one of the first and second radio modules may operate independently to support radio communications of the handset, but with less performance than that provided by two or more radio modules. Also, a single one of the modules may operate integrally with integrated radio communications circuitry to improve performance of the device, as discussed above.

Figure 3:
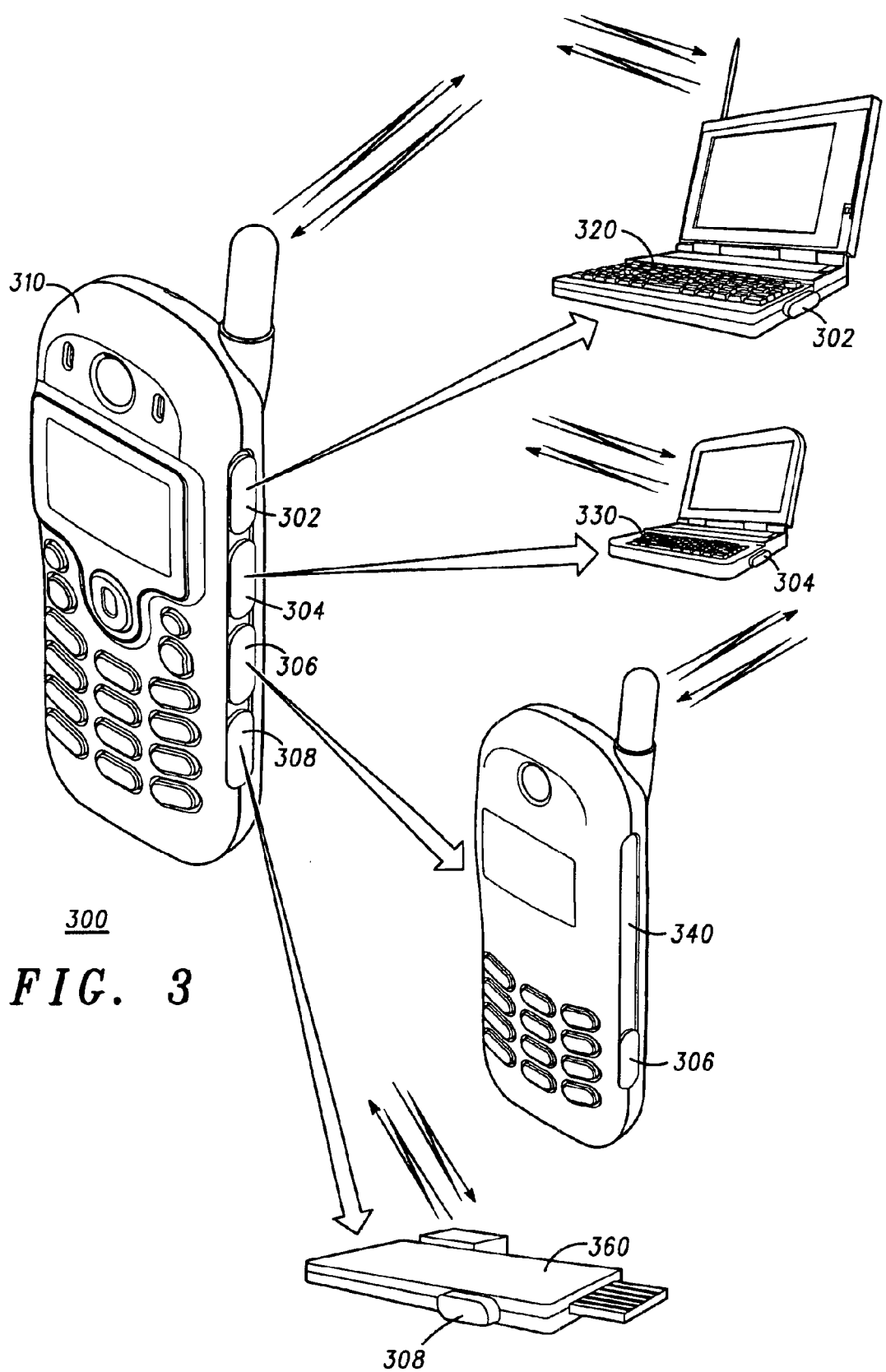
FIG. 3 is an exemplary system of mobile wireless communications devices that share interchangeable transceiver modules.

FIG. 3 is an exemplary system 300 of electronics devices, which are capable of sharing radio communications enabling modules. The exemplary system comprises, more particularly, a cellular telephone handset 310, a notebook computer 320, a two-way pager 340, a second cellular handset 350, and a removable card 360.

Generally, at least one of the devices includes at least one module that is removably coupled thereto, and that which may be shared or connected to one of the other devices not having a module, thereby enabling radio communications of the other device. In FIG. 3, the first device 310 includes a plurality of four modules 302, 304, 306 and 308, all of which are removably coupled thereto. One of the modules supports radio communications of the device when the module is coupled thereto.

Preferably, multiple radio modules support common radio communications of the device when more than one of the modules is coupled thereto, for example, by improving sensitivity, and/or bandwidth, or some other aspect of performance. Alternatively, the one of radio modules of the first device 310 cooperates integrally with radio communications circuitry integrated in the device 310 to improve the performance of the device 310.

The one or more other devices of the system are capable of accommodating at least one of the modules of the first device. When one of the modules of the first device is connected to the one of the other devices, the other device is capable of radio communications or performing some other feature enabled by the module. In the exemplary system of FIG. 3, the first radio module 302 is coupled to the notebook computer 320, thereby enabling radio communications thereof. Similarly, the second, third and fourth modules 304, 306 and 308 may be removed from the first device 310 and connected to the two-way paging device 330, the cellular device 340 and the removable card device 360, respectively, thereby enabling radio communications of each of the corresponding other devices.

In some embodiments, at least one of the modules of the first device 302 is removed and connected to one of the other devices 320, 330, 340 and 360, which cooperates with an integrated radio device or another module to provide improved performance to the other device. In other preferred embodiments, however, the other devices do not include any integrated radio communications circuitry, whereby one of the modules is required to enable radio communications.

In the exemplary cellular communications system of FIG. 3, for example, two or more of the modules in the first device 310 are connectable to one of the other devices to improve the radio performance thereof. Alternatively, at least one of the modules cooperates with integrated radio capabilities to provide improved radio performance.

In some embodiments, first and second radio modules from one communications device, for example, a cellular or other radio communications device, are shared among corresponding first and second radio communications devices, thereby enabling communications between and among the first and second radio communications devices, for example, either directly or via a radio communications network, like a cellular network.

Figure 4:
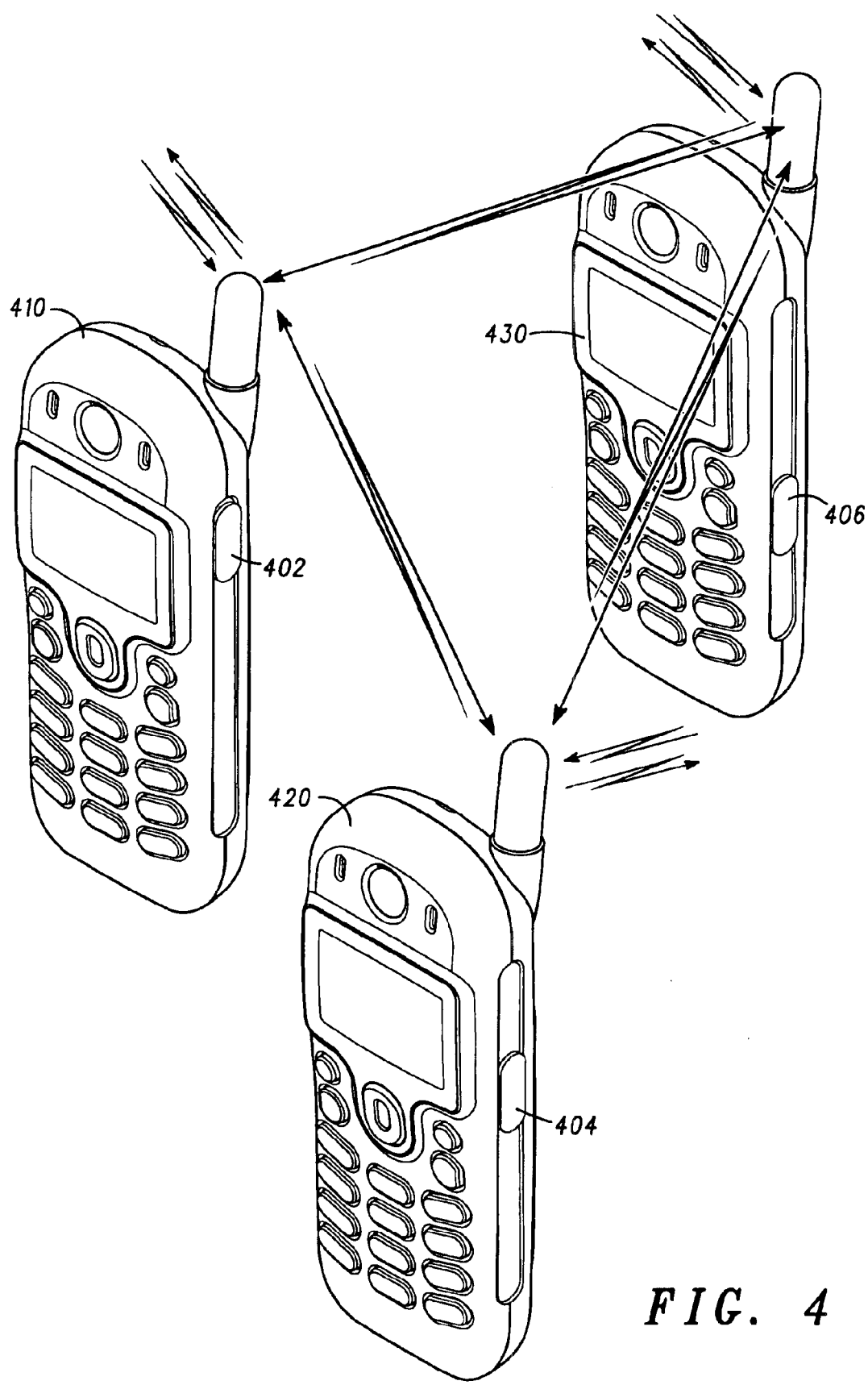
FIG. 4 is another exemplary system of communications devices.

In the exemplary system of FIG. 4, first, second and third radio modules 402, 404 and 406 are disposed in corresponding radio communications devices 410, 420, and 430 to enable the devices to communicate with each other, either directly or via a communications network, which is not illustrated in FIG. 4. Preferably, at least one of the communications devices of the system of devices is capable of utilizing at least one of the radio modules in a manner that improves communications as discussed above.

In some communications device systems, one of the communications handset body members is configured with more non-radio communications essential features than other communications handset body members of the system. For example, a first cellular handset body member having a plurality of removable radio modules, or having one radio module and integrated radio capabilities, includes only the most basic or essential features required for radio communications, for example, without multi-media and other premium features. A second handset body member of the system, without any radio modules, includes non-essential radio communications features, for example, multi-media features, user applications, etc., not included in the first handset having the one or more radio modules.

In one embodiment, the second handset body member is enabled for radio communications only by first connecting one of the radio modules of the first radio handset to the second radio handset. The cost of the first cellular handset is thus based largely on the cost of the essential radio communications features, whereas the cost of the second handset is based largely on the cost of the non-essential radio communications features. According to this aspect of the invention, the first and second handsets are independently operable as first and second wireless communications device when one of the first and second radio modules is coupled to the first handset body members and the other radio module is coupled to the other handset body member.

While the present inventions and what are considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A mobile wireless communications device, comprising:
   a first radio module coupled to an electrical circuit of the mobile wireless communications device;
   a second radio module removably coupled to the electrical circuit of the mobile wireless communications device,
   the first and second radio modules integrally operable to support a common radio communications protocol of the mobile wireless communications device when the first and second radio modules are both coupled to the electrical circuit of the mobile wireless communications device.

2. The mobile wireless communications device of claim 1, the first radio module operable independently to support radio communications of the mobile wireless communications device when only the first radio module is coupled to the electrical circuit of the mobile wireless communications device.

3. The mobile wireless communications device of claim 1 including a processor coupled to memory, the processor coupled to a display and to an input device, the processor coupled to the electrical circuit.

4. The mobile wireless communications device of claim 1, the first and second radio modules integrally operable to provide increased sensitivity in common wireless communications of the mobile wireless communications device, relative to sensitivity provided by only one of the first and second radio modules, when the first and second radio modules are coupled to the electrical circuit of the mobile wireless communications device.

5. The mobile wireless communications device of claim 1, the first and second radio modules integrally operable to provide increased throughput for common communications of the mobile wireless communications device, relative to communication throughput provided by only one of the first and second radio modules, when the first and second radio modules are coupled to the electrical circuit of the mobile wireless communications device.

6. The mobile wireless communications device of claim 1, the first and second radio modules include corresponding first and second transceiver portions capable of operating according to a common wireless communications protocol on a common signal.

7. The mobile wireless communications device of claim 1, the first and second radio modules include corresponding first and second transceiver portions that support an essential portion of a common cellular communications standard.

8. A system of cellular communications handsets, comprising:
   first and second separate communications handsets,
   a first radio module coupled to an electrical circuit of the first communications handset;
   a second radio module removably connectable to an electrical circuit of the second communications handset,
   the first and second radio modules integrally operable to support a common wireless communications protocol of the first communications handset when both of the first and second radio modules are coupled to the electrical circuit of the first communications handset.

9. The system of cellular communications handsets of claim 8, the first radio module independently operable to support communications of the first communications handset when only the first radio module is coupled to the electrical circuit of the first communications handset.

10. The system of cellular communications handsets of claim 8, the first and second radio modules for providing increased sensitivity in common wireless communications, relative to sensitivity provided by only the first radio module, when both of the first and second radio modules are coupled to the electrical circuit of the first communications handset.

11. The system of cellular communications handsets of claim 8, the first and second radio modules for providing an increased data rate in common wireless communications, relative to a data rate provided by only the first radio module, when both of the first and second radio modules are coupled to the electrical circuit of the first communications handset.

12. The system of cellular communications handsets of claim 8, each of the first and second communications handsets include a processor coupled to memory, the processor coupled to a display and to an input device, the processor coupled to the electrical circuit, the first and second radio modules having corresponding first and second radio transceiver portions.

13. The system of cellular communications handsets of claim 12, the first communications handset configured with more non-radio communications essential features than the second communications handset.

14. The system of cellular communications handsets of claim 8, the first and second radio modules support a common cellular communications standard.

15. The system of cellular communications handsets of claim 8, the first and second communications handsets independently operable as first and second mobile wireless communications handsets when the first and second radio modules are coupled to the electrical circuit of the corresponding first and second communications handsets.

16. A system of mobile electronics devices capable of wireless communications, comprising:
   a first electronics device having a first radio module coupled thereto;
   a second electronics device, separate from the first electronics device, having a second radio module removably coupled thereto;
   the second radio module removably coupleable to the first electronics device,
   the first and second radio modules supporting at least one of transmission or reception of a common radio signal when both of the first and second radio modules are coupled to the first electronics device.

17. The system of claim 16, the first and second radio modules include corresponding first and second radio transceiver portions supporting a common wireless communications protocol.

18. The system of claim 16, at least one of the first and second separate electronics devices is a cellular telephone.

19. The system of claim 16, at least one of the first and second separate electronics devices is a portable computer.

20. A wireless communications device, comprising:
   an electrical circuit;
   a first radio module coupled to the electrical circuit of the wireless communications device;
   a second radio module removably coupled to the electrical circuit of the wireless communications device,
   the first and second radio modules integrally operable to communicate a common radio signal when the first and second radio modules are both coupled to the electrical circuit of the wireless communications device.

21. The wireless communications device of claim 20, the first radio module operable independently to communicate a radio signal when only the first module is coupled to the electrical circuit of the wireless communications device.

22. The wireless communications device of claim 20 including a processor coupled to memory, the processor coupled to a display and to an input device, the processor coupled to the electrical circuit of the wireless communications device.

23. The wireless communications device of claim 20, the first and second radio modules integrally operable to provide increased sensitivity for the communication of the common radio signal when both of the first and second radio modules are coupled to the electrical circuit of the wireless communications device.

24. The wireless communications device of claim 20, the first and second radio modules integrally operable to provide increased throughput for the communication of the common radio signal when both of the first and second radio modules are coupled to the electrical circuit of the wireless communications device.

25. The wireless communication device of claim 20, the first and second radio modules include corresponding first and second transceiver portions that communicate according to a common wireless communications protocol.

* * * * *